Nov. 21, 1950     T. BOCKMAN     2,530,645
CATALYST CONTACTING APPARATUS
Filed Dec. 30, 1947
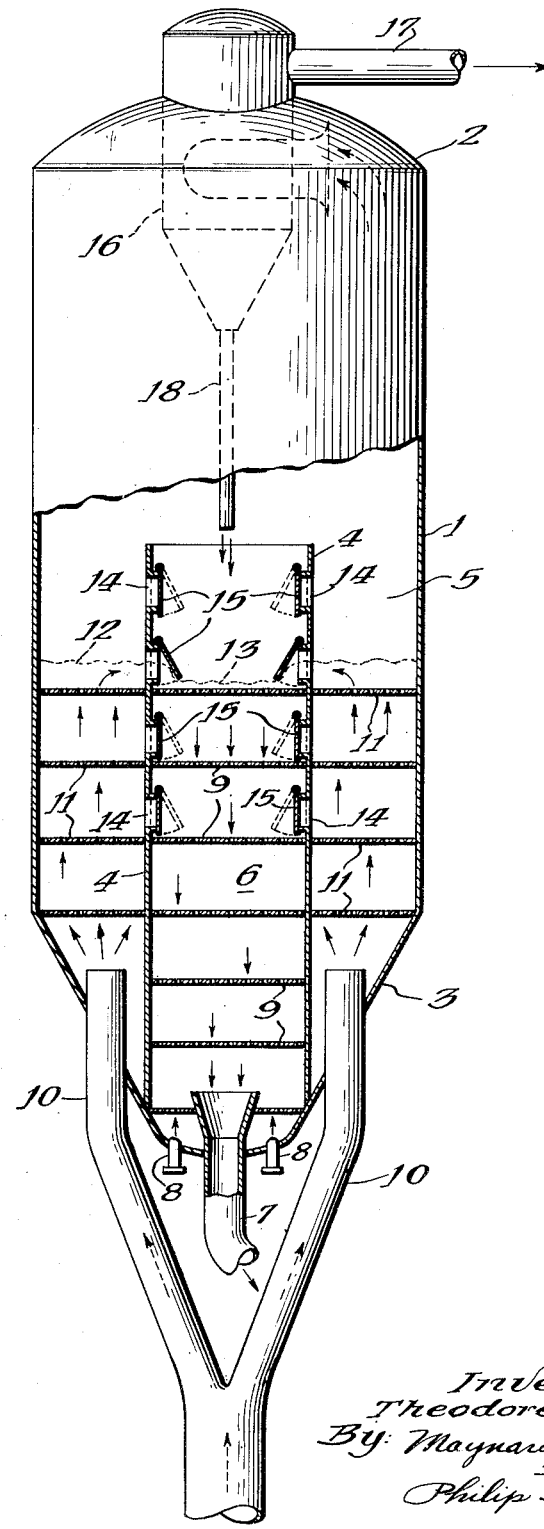
Inventor:
Theodore Bockman
By: Maynard P. Venema
Attorney
Philip T. Liggett
Agent Patented Nov. 21, 1950

2,530,645

UNITED STATES PATENT OFFICE 2,530,645

CATALYST CONTACTING APPARATUS

Theodore Bockman, Evanston, Ill., assignor to Universal Oil Products Company, Chicago, Ill., a corporation of Delaware Application December 30, 1947, Serial No. 794,611

2 Claims. (Cl. 23—288)

This invention relates to an improved apparatus for contacting and stripping finely divided solid particles, and more specifically, to a catalyst reactor having an entirely internal stripper. The apparatus is constructed and arranged to obviate the need of an additional external stripper, while providing a unit that is very flexible and efficient in its operation.

In the fluidized catalyst type of operation, a relatively dense phase bed of catalyst particles is maintained in a state of hindered settling within a reaction zone, with a continuous stream of gaseous or vaporous reactants and catalyst particles being charged thereto in order to maintain a fluidized bed of catalyst. A stream of contaminated catalyst particles, upon which deleterious carbonaceous products are deposited, is continuously withdrawn from the fluidized bed in the reaction zone and passed to a regenerating zone wherein the contaminants are removed to restore the catalytic activity of the particles. The particles in the regenerating zone are maintained in a fluidized state of hindered settling by a continuous stream of oxidizing gas which effects a burning and removal of the deleterious carbonaceous materials on the particles. The catalyst particles which are separated from the reaction zone contain a considerable amount of vaporizable hydrocarbon material adsorbed thereon or associated therewith. It is therefore beneficial to displace the hydrocarbons as well as occluded volatile material on the catalyst particles, in order to decrease the load in the regenerating system and aid in the control and elimination of excessive temperatures during the regeneration process. The stripping medium may be steam, nitrogen, flue-gas, or other relatively inert non-combustible gaseous material which can mix with the reaction products without adversely affecting the quality of the products, and which can be easily separated therefrom.

The present invention provides an improved contacting apparatus with a compact arrangement between the reaction and the stripping section, with the latter having especially arranged openings for receiving contaminated catalyst particles from the reaction section, and providing thereby a controlled flow which in turn provides a desirable conversion operation. Also, the construction is such as to permit a longer stripping section to be maintained within a vertically positioned reaction chamber in a manner whereby the latter is in general of no greater size, or length, than normally required by a reactor chamber for fluidized catalyst contact and which does not have an internal stripper.

Briefly, the improved contacting apparatus comprises in combination, an enclosed vertical chamber, a continuous partitioning wall extending from the bottom of the chamber to an intermediate point therein, this wall forming in the chamber a centrally positioned stripping section and an annular shaped contacting section, vertically spaced flow distributing means placed across both the reaction and stripping sections, vertically spaced openings in the upper portion of the partitioning wall, means for introducing a fluidized particle stream to the lower end of the annular shaped reaction section and for maintaining a dense phase particle bed therein, means for introducing a stripping medium to the lower end of the stripping section, means for withdrawing stripped solid particles from the lower end of the stripping section, and means for discharging resulting gaseous products substantially free of solid particles from the upper portion of the chamber.

In a preferable embodiment of the contacting apparatus, the vertically spaced openings in the upper portion of the stripper wall are positioned in tiers or rows, which not only are spaced vertically, but have a number of openings in each horizontal tier, with the openings being spaced equidistantly around the periphery of the stripping section. Thus, the flow of contaminated catalyst particles can be maintained in a uniform manner from all parts of the reaction section into the stripping zone. It is also a feature of the present invention to place a swinging type of check door, or flapper valve arrangement, on each of the aforesaid openings which will permit catalyst flow from the reaction section inwardly into the stripping section, but will prevent an outward flow of particles from the stripping section into the reaction zone. The check doors may be placed at the openings on the inside of the stripper and provided with a top hinge or pivot arrangement such that they normally hang in a closed position due to the weight of the door itself. However, in use, the pressure of the upper portion of the dense phase catalyst bed in the reaction section will be operative to open the doors and allow catalyst to flow into the stripping section, while conversely, a greater pressure on the inside of the stripper within the intermediate and lower portions of the dense phase bed will act to keep closed submerged doors and prevent catalyst flow outwardly from the stripper back into the reaction zone. This apparatus is thus arranged and adapted to be operated in a manner whereby the flow of gaseous fluidizing medium, which is introduced to each of the zones, is such as to maintain a greater catalyst density in the stripping section than in the reaction section. Therefore, the normal operation is to have the catalyst flow from the top of the dense phase bed in the reaction section into a somewhat denser phase bed maintained in the stripping section.

One of the principal advantages of the improved construction of this invention lies in the use of the automatic means for opening and closing the spaced openings between the reaction and stripping sections, which permits a controlled flow of catalyst in the proper direction, for varying depths of the dense phase bed which may be maintained within the reaction section for various types of conversions. Another advantage of the reactor-stripper arrangement, of this invention resides in the compact and economical construction of the unit. It has been found that the most efficient stripping sections require relatively long lengths with relation to cross sectional area or diameter, so that it has not been possible to obtain an adequate length of stripper in a properly designed reaction chamber for a commercial unit. It has therefore been necessary to lengthen the reaction chambers or allow part of the stripper to extend below, the chamber, or alternately, as has been frequently resorted to, a separate external stripper has been used in conjunction with the reaction chamber. However, the arrangement of this invention, with the stripper extending upwardly from the center of a cone shaped bottom head, permits a considerable length of the stripper to be placed within the lower head itself, and as a result a relatively long stripper is positioned entirely within the reaction chamber.

A centrally positioned stripper of a preferred embodiment of the apparatus, forms an annular shaped reaction zone, between the stripper wall and the wall of the chamber, which has a small or restricted cross-sectional area in comparison with the cross-sectional area of the upper portion of the chamber. An unobstructed upper chamber section, above the principal contacting and reaction section, provides a large volume space for settling out catalyst particles from the reaction products and a zone where a less dense catalyst phase may be passed through mechanical separating means for the substantially complete removal of catalyst particles from the reaction products. Also an annular shaped reaction section, is of advantage in providing a dense phase contacting bed from which contaminated catalyst particles can be withdrawn uniformly into the spaced openings around the wall of the stripping section.

Other features and advantages of this improved contacting apparatus will be apparent upon reference to the accompanying drawing and the following description thereof.

The drawing shows diagrammatically an elevational view, partially in section, of one desirable embodiment of the improved contacting apparatus.

Referring now to the drawing, the vertically positioned chamber 1 is provided with a closed upper head 2 and a closed conically shaped lower head 3. Extending upwardly from the bottom of the lower head 3 is a cylindrically shaped partitioning wall 4. The partitioning wall extends upwardly within the chamber 1 to a height which will be somewhat higher than the upper extremity of the normal dense phase bed which may be maintained in the annular reaction and contacting zone 5, between the wall 4 and the chamber wall 1. The enclosed zone, within the cylindrical wall 4, provides a stripping section 6 through which catalyst or other finely divided solid particles may descend, countercurrently to a stripping medium, prior to being discharged from the unit. An outlet conduit 7 at the bottom of the stripping section 6 provides means for withdrawing the stripped contacted particles and for transmitting them to a regenerator or other contacting apparatus, while inlet openings 8 also at the bottom of the stripping section, provide means for charging steam, flue gas, or other stripping medium, to the enclosed zone for contacting the solid particles while maintaining them in a turbulent dense phase bed.

A series of vertically spaced and perforated distributing plates 9 are also placed horizontally across the stripping section 6 in order to provide a redistribution of the countercurrently moving solid particle and stripping medium streams, and thereby insuring an efficient mixing and contacting of particles within this zone.

In a preferable embodiment, two or more conduits 10 are passed through the lower conical head 3 to communicate with and to discharge into the lower portion of the annular shaped reaction section 5. A plurality of inlets, for charging the catalyst particles and the reactant streams to the reaction zone are desirable, for they will provide a more uniform distribution of products thereto and maintain a more uniform fluidized dense phase contacting bed. A series of vertically spaced distribution plates 11, are also placed across the reaction zone 5 in order to effect an efficient mixing and redistribution of the material within this dense phase bed, as well as prevent vertical recycling between the reactant stream and the solid material.

A valuable structural advantage is obtained by the use of the cylindrical partitioning wall in the chamber, in that the wall may be used to function as an intermediate supporting member for these horizontal grid plates. Thus, troublesome intermediate posts, or long heavy beamlike members, can be eliminated, and a more economical grid plate construction is attained.

In the partitioning wall 4, a series of vertically spaced openings 14 are provided to permit the passage of solid particles from the upper portion of a dense phase fluidized bed in the reaction zone into the inner stripping section. In a preferable construction, two or more of the openings 14, are spaced at each vertical level and are spaced equidistantly around the periphery of the wall 4 so that solid particles may be withdrawn in a uniform manner from the annular shaped reaction section into the stripping section. The vertically spaced multiple rows or tiers of openings in turn provide means for passing the particles to the stripping section, regardless of the height of the dense phase fluidized bed being maintained in the reaction zone 5.

As noted herein above, in carrying out the conversion operation with the apparatus of this invention, the fluidization of the dense phase beds within the reaction zone 5 and the stripping section 6, are maintained so as to provide a catalyst bed of lessor density in the reaction section than in the stripping section. For example, if the density in the reaction section is of the order of 25 pounds per cubic foot, the catalyst density maintained in the stripping section will be of the order of 30 pounds per cubic foot. In this drawing, the broken line 12 indicates the upper extremity of a dense phase catalyst bed in the reaction zone 5, while the broken line 13 indicates the upper extremity of the dense phase catalyst bed in the stripping section 6 and the density relationship serves to maintain the desired catalyst flow in the unit, from the top of bed 12 to the top of bed 13.

On the inside of each of the openings 14 is mounted a flapper type valve or check door 15, which is pivoted at its upper end. The doors 15 are preferably constructed of a relatively light weight material and are hinged in a manner to be easily opened by a slight amount of external pressure. The doors which are not in use will thus hang in a closed position while those at the upper extremity of the dense phase bed in the reaction zone, as indicated in the drawing, may be pushed open so that the solid catalyst particles will flow from the top of the bed 12 into the lower portion of the dense phase bed 13. The doors 15 which are below the level of the dense phase bed will normally stay in a closed position due to the catalyst density being maintained somewhat greater within the stripping section than in the reaction section, and the doors will thus prevent the undesirable recirculation of the catalyst particles or other solid particles from the inner zone back into the reaction zone.

The usual type of contacting apparatus with an internal stripper does not have the vertical spaced openings in the latter and the reaction chamber is limited to an operation which maintains a deep dense phase bed extending above the top of the stripping section, so that the solid particles can flow from the top of the bed down into the stripping zone. However, those familiar with fluidized conversion operations realize that in some instances it is desirable to maintain different depths of contacting beds. It may also be seen that a more positive control of catalyst flow is attained while retaining a flexibly operating contacting unit as a result of the vertically spaced, multiple opening arrangement of this invention.

The upper portion of the contacting chamber 1 provides a separation zone wherein the solid particles will tend to separate from the gaseous material and fall back into the dense phase bed. In the usual apparatus, one or more centrifugal type separators 16 are positioned in the upper part of the chamber to accommodate the passage of resulting reaction products and entrained solid particles prior to discharging the gaseous or vaporous products from the chamber. The reaction products substantially free of solid matter are passed from the chamber through the outlet conduit 17, while the separated and recovered solid material is collected in the lower end of the separator 16 and returned through a downpipe 18 to the dense phase bed in the lower portion of the chamber.

The contacting apparatus of this invention, which has been described hereinabove, is particularly adapted to the catalytic conversion of hydrocarbons, wherein finely divided ground particles of catalyst, or specially formed small spherical particles, are employed as the catalytic contacting material. However, this contactor and stripper arrangement need not be limited to hydrocarbon conversion operations only.

The accompanying drawing, while illustrating diagrammatically a preferred construction and arrangement, is not to be used to limit the improved apparatus to the exact details which are shown and described. For example, other types and forms of check valves may be employed at the openings 14 to prevent the back flow of catalyst from the stripping section to the reaction section. Also, the various perforated plates 9 and 11 may be replaced with other stream distributing means, such as baffles, or the like, which may provide the desired turbulent mixing and redistribution of catalyst in the dense phase contacting zones.

I claim as my invention:

1. An improved apparatus for contacting and stripping finely divided solid particles, which comprises in combination, an enclosed vertical chamber, a continuous partitioning wall extending from the bottom of said chamber to an intermediate point therein, said wall forming thereby a centrally positioned columnar stripping section and an annular shaped contacting section, vertically spaced tiers of openings in the upper portion of said partitioning wall with the openings in each tier spaced around the periphery of said wall, swinging check doors having pivoted supporting means at the upper end thereof and mounted on the inside of said openings in the upper portion of said stripping section, said doors being operative to swing freely inward only and thereby prevent the flow of solid particles outwardly from the interior of said stripping section into said contacting section, inlet means for introducing a fluidized particle stream to the lower end of said annular contacting section whereby to maintain a dense phase particle bed therein, additional inlet means for introducing a stripping medium to the lower end of said stripping section, means for withdrawing stripped solid particles from the lower end of said stripping section, and outlet means for discharging resulting gaseous products substantially free of solid particles from the upper portion of said chamber.

2. An improved reactor and stripper for handling fluidized finely divided solid particles which comprises in combination an enclosed vertically positioned chamber having an elongated conically shaped lower head, a cylindrical partitioning wall extending from the lower end of said conical head of said chamber to a mid-point in said chamber and forming thereby a centrally positioned columnar stripping section entirely within said chamber and an annular shaped contacting section, a plurality of vertically spaced perforated distributing plates extending across both the stripping and contacting sections, a plurality of vertically spaced openings in the upper portion of said partitioning wall suitable for passing particles laterally from said contacting section to said stripping section, swinging check doors having pivoted supporting means at the upper end thereof and mounted on the inside of said openings in the upper portion of said stripping section, said doors being operative to swing freely inward only and thereby prevent the flow of solid particles outwardly from the interior of said stripping section into said contacting section, inlet means at the lower end of said contacting section for introducing a fluidized particle stream thereto and for maintaining a dense phase particle bed therein, inlet means at the lower end of said centrally positioned stripping section for introducing a stripping medium thereto, means for withdrawing stripped solid particles from the bottom of said stripping section, particle removing means in the upper portion of said chamber and means for discharging therefrom resulting gaseous products substantially free of solid particles.

THEODORE BOCKMAN.

REFERENCES CITED

The following references are of record in the file of this patent:

UNITED STATES PATENTS

| Number | Name | Date |
|---|---|---|
| 2,446,678 | Voorhees | Aug. 10, 1948 |

FOREIGN PATENTS

| Number | Country | Date |
|---|---|---|
| 574,064 | Great Britain | Dec. 19, 1945 |
| 574,892 | Great Britain | Jan. 24, 1946 |